Jan. 23, 1968  R. W. REPSHER  3,365,323
STABILIZED RED PIGMENT FILTER COATING IN A FLUORESCENT LAMP
Filed May 17, 1963
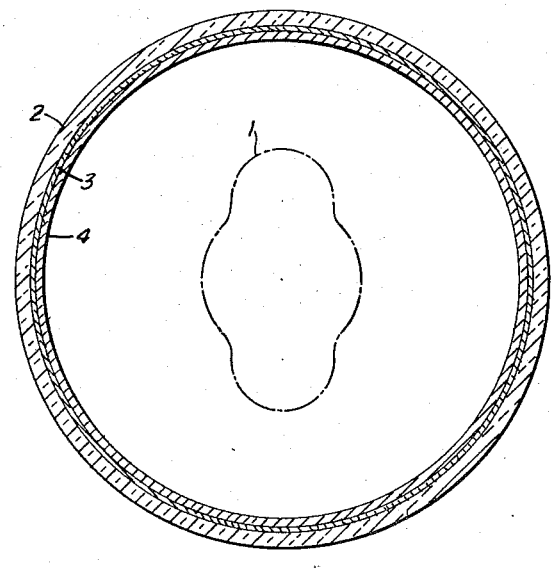
INVENTOR.
ROBERT W. REPSHER
BY
W. D. Palmer

United States Patent Office 3,365,323
Patented Jan. 23, 1968

3,365,323
STABILIZED RED PIGMENT FILTER COATING IN A FLUORESCENT LAMP
Robert W. Repsher, Kinnelon, Butler, N.J., assignor to Westinghouse Electric Corporation, Pittsburgh, Pa., a corporation of Pennsylvania
Filed May 17, 1963, Ser. No. 281,289
4 Claims. (Cl. 117—33.5)

This invention relates to a stabilized red pigment and, more particularly, to the use of such a pigment as a filter coating in the manufacture of red fluorescent lamps.

It is known that certain colors, such as red, are not readily obtainable by any known luminescent material used in fluorescent lamps. In order to obtain colors such as red in a fluorescent lamp, luminescent materials are used which, although they do not directly emit the desired color, do contain wavelengths corresponding to the desired color and other wavelengths in addition. A filter layer is interposed between the glass envelope of the fluorescent lamp and the layer of luminescent material, which filter layer is designed to transmit the wavelength corresponding to the desired color but to absorb wavelengths of the other colors.

In order to obtain a red emitting fluorescent lamp, a cadmium selenium sulfide pigment is used as the filter material. The filter coating is generally applied to the interior of the envelope as a suspension in a lacquer containing a binder material, such as nitrocellulose or ethylcellulose. After the filter coating is applied to the interior of the envelope, it must be baked at high temperatures to burn out the binder material. The pigment in the filter layer is sensitive to oxidation during this burning out operation. If oxidation of the pigment occurs due to excessively high temperatures, black discoloration of the filter layer results. If, however, the temperature used in the baking operation is too low, not all of the binder material is removed and a brown discoloration results. Proper adjustment of the temperature during the baking operation so that no discoloration results is extremely difficult.

It is an object of this invention to provide a heat stable cadmium sulfide pigment composition. It is another object of this invention to provide a fluorescent lamp having a filter coating comprising a cadmium sulfide pigment composition which is not subject to discoloration at very high temperatures. It is a further object of this invention to provide a method for the preparation of a heat stable cadmium sulfide pigment.

These and other objects are accomplished by the practice of this invention which, briefly, comprises providing a heat stable pigment composition comprising a cadmium sulfide pigment, and more particularly cadmium selenium sulfide pigment, and from about 10 to 30 percent by weight of the pigment of boric acid. This composition is applied as the filter coating on the interior surface of the transparent envelope of a fluorescent lamp and is overlaid with a phosphor coating.

The aspects of this invention which are capable of illustration are shown in the accompanying drawing which is a cross-sectional view of a fluorescent lamp.

As illustrated in the drawing, an electrode 1 of conventional construction is disposed within a tubular glass envelope 2, shown in section. The inner wall of the envelope 2 is provided with a thin layer of a filter coating 3 which is overlaid with the usual layer of phosphor material 4.

In accordance with the practice of this invention, cadmium selenium sulfide may be thoroughly admixed with the boric acid, a binding material such as for example ethyl cellulose, nitrocellulose, etc., and a volatile organic solvent material such as xylol. Sufficient binder material and volatile organic solvent are used to impart the proper viscosity to the mixture so that the correct amount of the mixture will cling to the inner surface of the envelope 2 when the mixture is flushed through the tube.

It is preferred to include in the mixture from about 20% to 50% by weight of the pigment of barium sulphate. The barium sulphate acts to dilute the color of the pigment so that a thickness of the filter layer sufficient to entirely cover the glass can be used without absorbing too much of the emitted light.

One manner of coating the envelope 2 with the filter composition is by flushing the suspension of pigment and boric acid into the tube to be coated by air pressure and then allowing it to drain out. Another method is to spray the suspension on the inside of the top of the tube and let it drain downward. Due to the viscosity of the mixture, a predetermined amount of the mixture clings to the inner surface of the envelope 10.

The tube is then dried to remove the volatile solvents. Subsequently the bulb is heated to a temperature high enough to convert the residual binder material such as ethyl cellulose, to carbon dioxide and water. Lehring for about three minutes at about 650° C. is sufficient to burn out all of the binder material. This also converts the boric acid to boric oxide, so that the weight ratio of residual boric oxide to pigment, after lehring, is from about 5% to 17%. There is thereby formed the filter layer 3 within the envelope 2. The presence of the boric acid in the applied filter composition permits the use of much higher temperatures than has heretofore been possible without discoloration of the filter layer.

After the filter layer 3 has been formed, it is overlaid with a phosphor coating by conventional technique such as, for example, by flushing with an organic suspension of the phosphor material. The phosphor may be any suitable luminiscent material which will produce the desired color in association with the filter layer such as, for example, cadmium borate. The tube is again dried and the lehring step is repeated to burn out the organic binder in the phosphor suspension.

The following examples illustrate the best modes contemplated for carrying out this invention.

*Example 1*

A ball mill is loaded with 79.0 grams of cadmium selenium sulfide pigment, 71.0 grams of barium sulphate, 20.0 grams of boric acid, 100 cc. of xylol and 100 cc. of ethyl cellulose lacquer. The mixture is ball milled for 16 hours after which 220 cc. of ethyl cellulose lacquer are added to the mill. The mixture is then milled for an additional 15 minutes. The coating mixture is then emptied from the mill and 350 cc. of ethyl cellulose lacquer and 130 cc. of xylol are added. This mixture is then flushed over the inner surface of the glass envelope of a fluorescent lamp bulb. The volatile solvents are then removed by evaporation after which the bulb is lehred to a temperature of approximately 650° C. for approximately 3 minutes in order to burn away the residual ethyl cellulose binder material. No discoloration of the filter layer occurs. A layer of luminescent material is then applied over the filter layer by conventional technique.

By way of contrast, when a bulb is prepared as described above with the exception that the boric acid is omitted, discoloration occurs due to oxidation of the pigment material.

In the foregoing example, the mixed pigment and boric acid are heated together only after coating onto the fluorescent tube. As an alternative method for preparing the stabilized pigment composition, the pigment and mixed boric acid can be heated prior to preparation of the coating mixture. Such an alternative method is illustrated in the following example.

*Example 2*

An intimate admixture of 100 grams of cadmium selenium sulphide pigment and 25 grams of boric acid is prepared by grinding these materials together with a mortar and pestle. The admixture is placed in a covered silica tray and fixed in a muffle furnace at 600° C. for 1 hour, which converts the boric acid to boric oxide. After firing, the pigment is crushed to break up the agglomerates formed during the firing process. The resultant powder is very heat stable and resistant to oxidation at extremely high temperatures. It may be used to provide a filter coating for the interior surface of a transparent envelope of a fluorescent lamp by mixing it with a suitable quantity of binder material and volatile organic solvents and flushing the mixture over the inner surface of the transparent envelope. It may also be used in any other embodiment where there is need for a red pigment which is extremely resistant to oxidation by high temperatures such as in paints for jet aircraft, rockets, etc.

In the foregoing examples, boric acid has been added to the pigment to stabilize same. Boric acid is preferred since it is readily obtainable as a fine powder. Boric oxide can be substituted for the boric acid, however, reducing the amount added to the pigment by an amount which corresponds to the water in the boric acid. After firing the mixture, as outlined in detail in Example 2, there apparently is no reconversion of the boric oxide to boric acid.

While the invention has been described with respect to what are at present considered to be the preferred embodiments thereof, it will be understood, of course, that substitutions, modifications, changes, and the like may be made therein without departing from the true scope.

I claim as my invention:

1. In a fluoroescent lamp having a light-transmitting envelope coated on its interior surface with a filter coating, said filter coating being overlaid with a phosphor coating, the improvement in which the filter coating comprises a cadmium sulfide pigment having mixed therewith from about 5% to 17% by weight of said pigment of boric oxide.

2. In a fluorescent lamp as defined in claim 1 wherein said pigment is cadmium selenium sulfide.

3. In a fluorescent lamp having a transparent envelope coated on its interior surface with a filter coating, said filter coating being overlaid with a phosphor coating, the improvement in which the filter coating comprises mixed barium sulphate, cadmium selenium sulfide pigment, and from about 5% to 17% by weight of said pigment of boric acid.

4. In a fluorescent lamp as defined in claim 3, wherein said barium sulfate is present in amount of from about 20% to 50% by weight of said pigment.

References Cited

UNITED STATES PATENTS

| | | | |
|---|---|---|---|
| 2,290,186 | 7/1942 | Holman et al. | 252—301.6 |
| 2,686,158 | 8/1954 | Jones | 252—301.2 |
| 2,838,707 | 6/1958 | Schwing et al. | 252—301.3 |
| 2,858,234 | 10/1958 | Ishler et al. | 117—33.5 |
| 2,905,572 | 9/1959 | Jones | 117—33.5 |
| 3,024,381 | 3/1962 | Dalton et al. | 252—300 |

FOREIGN PATENTS 243,847   3/1963   Australia.

WILLIAM D. MARTIN, *Primary Examiner.*

S. W. ROTHSTEIN, P. F. ATTAGUILE,
*Assistant Examiners.*